United States Patent [19]
Tomita

[11] Patent Number: 5,179,277
[45] Date of Patent: Jan. 12, 1993

[54] METHODS FOR OPTICALLY SCANNING A SCANNED FACE WITH AN EQUI-ANGULAR SCAN VELOCITY

[75] Inventor: Kan Tomita, Tokyo, Japan
[73] Assignee: Ricoh Company, Ltd., Tokyo, Japan
[21] Appl. No.: 821,172
[22] Filed: Jan. 16, 1992

[30] Foreign Application Priority Data

Jan. 17, 1991 [JP] Japan .................... 3-17163

[51] Int. Cl.⁵ .............................. H01J 5/16
[52] U.S. Cl. ..................... 250/235; 358/494
[58] Field of Search ............ 250/235, 236, 207.2, 250/207.4; 358/491, 480, 481, 493, 494; 359/212, 217

[56] References Cited
U.S. PATENT DOCUMENTS

4,998,790  3/1991  Iizuka et al. ................. 250/235
5,103,091  4/1992  Hirose et al. ................. 250/235

Primary Examiner—David C. Nelms
Assistant Examiner—Que T. Le
Attorney, Agent, or Firm—Oblon, Spivak, McClelland, Maier & Neustadt

[57] ABSTRACT

A method for optically scanning a scanned face includes the steps of emitting a laser beam from a laser source, converging the emitted laser beam with respect to a cross scan-corresponding direction, deflecting the converged laser beam at an equi-angular velocity forward the second face, image-forming the deflected laser beam as a light spot on the scanned face by means of an f-$\theta$ lens system, and scanning the scanned face with the light spot, the step of emitting the laser beam including the step of modulating the laser source such that one picture element can be recorded within a period of time defined by a predetermined formula.

4 Claims, 3 Drawing Sheets

METHODS FOR OPTICALLY SCANNING A SCANNED FACE WITH AN EQUI-ANGULAR SCAN VELOCITY

BACKGROUND OF THE INVENTION

1. Field of the Invention

The present invention relates to a method of optically scanning a scanned face which can be used in a laser beam printer or digital copying machine.

2. Description of the Related Art

There has been widely known a method of optical scanning which a comprises the steps of deflecting at an equi-angular velocity a laser beam emitted from a laser emitting device, condensing the deflected laser beam by means of an image-forming optical system including f-$\theta$ lenses to form a light spot on the scanned face, and scanning optically the scanned face with the formed light spot.

In the conventional optical scanning apparatus in which the above-mentioned optical scanning method has been realized, the laser beam for optical scanning is deflected at a relatively small angle, and thus makes it possible to keep in an excellent condition the f-$\theta$ characteristic of f-$\theta$ lenses used in the image-forming optical system. For this reason, the time t allotted for scanning one picture element in optical scanning has been determined so as to satisfy the following relation:

$$t = L/(f \cdot N \cdot \omega) \quad (1)$$

where f is the focal length of the image-forming optical system with respect to the main scanning direction, L the effective scan width, N the number of picture elements within the effective scan width L and $\omega$ the angular velocity of the deflection of deflected laser beam.

In recent years, however, there have been a strong demand for decrease in its size and cost in the art of optical scanning apparatuses, resulting in necessity of widening field angle of an image-forming optical system and reducing the number of lenses constituting the image-forming optical system. This requirement gives rise to difficulty for producing an image-forming optical system having an excellent f-$\theta$ characteristic.

In a case where an image-forming optical system does not have a sufficiently good f-$\theta$ characteristic, the velocity of light spot moving on the scanned face varies depending upon the optically scanned positions, and this makes noticeable magnification error that an image written-in by the optical scanning is expanded and contracted in accordance with scanning positions in the main scanning direction, and that the entire image differs from the recording dimension set in its design.

As a method of correcting such a magnification error, there has been known a method in which the optical scanning is performed while varying the time t for scanning one picture element in accordance with positions of the light spot in optical scanning (Japanese Patent Application Laying-open No. 32769/1987), however the realization of this method needs a complicated circuit device, and does not satisfy the demand of decreasing the cost of the optical scanning apparatus.

In addition, for the purpose of decreasing the cost of an optical scanning apparatus, plastic optical elements are being introduced into the optical scanning apparatus, however this application of plastic optical elements to an optical scanning apparatus will further increase the magnification error mentioned above due to variations in characteristic of plastic optical elements caused with change in temperature.

SUMMARY OF THE INVENTION

The present invention has been achieved in view of circumstances discussed above, and it is therefore an object of the present invention to provide a new method of optically scanning the scanned face, in which the aforementioned magnification error in an optical scanning apparatus can be effectively reduced.

According to the first feature of the invention, the object of the invention can be achieved by a method of optically scanning a scanned face, comprising the steps of:

emitting a laser beam from a laser source;

converging the emitted laser beam with respect to the cross scan-corresponding direction;

deflecting the converged laser beam at an equi-angular velocity toward the scanned face;

image-forming the deflected laser beam as a light spot on the scanned face by means of an f-$\theta$ lens system; and scanning the scanned face with said light spot;

the step of emitting the laser beam comprising the step of modulating the laser source such that one picture element can be recorded within a period of time t between $$L/(NV) \text{ and } 2\psi/(N\omega),$$

where, L is an effective scan width set in design, N is a number of picture elements to be recorded within the effective scan width L, $\omega$ is an angular velocity of the deflection of deflected laser beam, $v(\theta)$ is the scan velocity of light spot on the scanned face at a time when the deflected laser beam is deflected by a deflection angle $\theta$, $-\psi$ and $+\psi$ are respectively lower and upper limits of the integration $[\int v(\theta)d\theta]$ satisfying the relation $[L \cdot \omega = \int v(\theta)d\theta]$, and V is an arithmetical mean ((Vmax+Vmin)/2) with respect to a maximum value Vmax and a minimum value Vmin of $v(\theta)$ in the range of $$-\psi \leq \theta \leq \psi.$$

t

It should be noted that the relation of magnitudes between L/(NV) and 2 $\psi$/(N $\omega$) can not be determined uniquely, so that in some cases the former may be larger than the latter and in other cases vice versa. More specifically, the definition that t lies between L/(NV) and 2 $\psi$/(N $\omega$) means that $$L/(NV) \leq t \leq 2\psi/(N\omega)$$

or $$L/(NV) \leq t \leq 2\omega/(N\omega).$$

According to the first feature of the invention, the laser source is modulated such that one picture element can be recorded within a period of time t between L/(NV) and 2$\psi$/(N$\omega$), where L is the effective scan width set in design, N is the number of picture elements within the effective scan width L, $\omega$ is the angular velocity of the deflection of deflected laser beam, $v(\theta)$ is the scan velocity of the light spot at a time when the deflected laser beam is deflected by a deflection angle $\theta$, $-\psi$ and $+\psi$ are respectively lower and upper limits of the integration $[\int v(\theta)d\theta]$ satisfying the relation $[L \cdot \omega 32 \int v(\theta)d\theta]$, and V is an arithmetical mean ((Vmax- +Vmin)/2) with respect to a maximum value Vmax and a minimum value Vmin of v($\theta$) in the range of $-\psi \leq \theta \leq \psi$.

The method according to the first feature of the invention is constructed as mentioned above, and accordingly makes it possible to effectively reduce the magnification error even when the image-forming optical system is not particularly good in its f·$\theta$ characteristics.

According to the second feature of the invention, the object of the invention can be also achieved by a method of optically scanning a scanned face comprising the steps of:

emitting a laser beam from a laser source;

converging the emitted laser beam with respect to the cross scan-corresponding direction;

deflecting the converged laser beam at an equi-angular velocity by means of a deflecting means;

image-forming the deflected laser beam as a light spot on the scanned face by means of an f-$\theta$ lens system; and scanning the scanned face with the light-spot, the step of emitting the laser beam comprising the step of modulating the laser source such that one picture element can be recorded within a period of time of $(L \cdot 2\psi)/(Nnl\omega)$, where, L is an effective scan width set in design, N is a number of picture elements within the effective scan width L, $\omega$ is an angular velocity of the deflection of deflected laser beam, V($\theta$) is the scan velocity of the light spot on the scanned face at a time when the deflected laser beam is deflected by a deflection angle $\theta$, $-\psi$ and $+\psi$ are respectively lower and upper limits of the integration [$\int v(\theta)d\theta$] satisfying the relation [$L \cdot \omega = \int v(\theta)d\theta$], and l is an arithmetical average of the maximum value of l ($\phi$,n) and the minimum value of l ($\phi$,n), in which the function l ($\phi$,n) is defined by the following relation, $$\int_{-\{(\psi/n)+\phi\}}^{\{(\psi/n)+\phi\}} v(\theta)d\theta = l(\phi,n),$$

wherein $2 \leq n \leq 12$ and $-\psi + \frac{\psi}{n} \leq \phi \leq \psi - \frac{\psi}{n}$.

According to the second feature of the invention, the laser source is modulated such that one picture element can be recorded within a period of time t of about $(L \cdot 2\psi)/(Nnl\omega)$, where, L is the effective scan width set in design, N is the number of picture elements within the effective scan width L, $\omega$ is the angular velocity of the deflection of deflected laser beam, v($\theta$) is the scan velocity of the light spot at a time when the deflection beam is deflected by a deflection angle $\theta$, $-\psi$ and $+\psi$ are respectively lower and upper limits of the integration [$\int v(\theta)d\theta$] satisfying the relation [$L \cdot \omega = \int v(\theta)d\theta$], and l is an arithmetical average of the maximum value of l ($\phi$,n) and the minimum value of $l$($\phi$,n), in which the function l ($\phi$,n) is defined by the following relation:

$$\int_{-\{(\psi/n)+\phi\}}^{\{(\psi/n)+\phi\}} v(\theta)d\theta = l(\phi,n),$$

wherein $2 \leq n \leq 12$ and $-\psi + \frac{\psi}{n} \leq \phi \leq \psi - \frac{\psi}{n}$.

The method according to the second feature invention is constructed as mentioned above, and accordingly makes it possible to effectively reduce the magnification error even when the image-forming optical system is not particularly good in its f·$\theta$ characteristics.

According to the third feature of the invention, the object of the invention can be achieved by a method of optically scanning a scanned face, comprising the steps of:

emitting a laser beam from a laser source;

converging the emitted laser beam with respect to the cross scan-corresponding direction;

deflecting the converged laser beam at an equi-angular velocity by means of a deflecting means;

image-forming the deflected laser beam as a light spot on the scanned face by means of an f-$\theta$ lens system; and scanning the scanned face with the light spot, the step of emitting the laser beam comprising the step of modulating the laser source such that one picture element can be recorded within a period of time within a range of L/(Nv) to 2$\psi$(T)/(N$\omega$) in a case where optical elements arranged on an optical path from said laser source to said scanned face include at least one plastic optical element and where each of the steps is performed at a surrounding temperature ranging from a lower limit Tmin to an upper limit Tmax, wherein L is an effective scan width set in design, N is a number of picture elements to be recorded within the effective scan with L, $\omega$ is an angular velocity of the deflection of deflected laser beam, v($\theta$) is the scan velocity of the light spot at a time when the deflected laser beam is deflected by a deflection angle $\theta$, $-\psi$(T) and $+\psi$(T) are respectively lower and upper limits of the integration [$\int v(\theta)d\theta$] satisfying the relation [$L \cdot \omega = \int v(\theta)d\theta$] at a mean surrounding temperature defined by $T(=(Tmax+Tmin)/2)$, and v is an arithmetical mean of Vmax and Vmin, wherein Vmax is the maximum value selected from the following four values: the maximum value Vmax (Tmax) and the minimum value Vmin (Tmax) of v($\theta$) at a maximum surrounding temperature Tmax in a range of $-\psi(T) \leq \theta \leq +\psi(T)$, and the maximum value Vmax (Tmin) and the minimum value Vmin (Tmin) of v($\theta$) at a minimum surrounding temperature Tmin in a range of $-\psi(T) \leq \theta \leq +\psi(T)$, and Vmin is the minimum value selected from the four values of Vmax (Tmax), Vmin (Tmax), Vmax (Tmin) and Vmin (Tmin).

It should be noted that the relation of magnitudes between L/(NV) and 2 $\psi$ (Tmean)/(N$\omega$) can not be determined uniquely, but in some cases the former may be larger than the latter and in other cases vice versa. Accordingly, the definition that t lies between L/(NV) and 2 $\psi$ (T)/(N$\omega$) means that L/(NV)$\leq$ t $\leq$ 2$\psi$(T)/(N$\omega$)

L/(NV)$\geq$ t $\geq$ 2$\psi$(T)/(N$\omega$).

According to the third feature of the invention, the laser source is modulated such that one picture element can be recorded within a period of time within a range of L/(NV) to 2$\psi$(T)/(N$\omega$), and hence it becomes possible to effectively reduce the magnification error of the f-$\theta$ lens in the image-forming optical system even when the image-forming optical system includes one or more plastic optical elements which increase the magnification error with change in characteristics of the plastic optical elements caused by change in the surrounding temperature.

According to the fourth feature of the invention, the object of the invention can be also achieved by a method of optically scanning a scanned face, comprising the steps of:

emitting a laser beam from a laser source, converging the emitted laser beam with respect to the cross scan-corresponding direction;

deflecting the converged laser beam at an equi-angular velocity by means of a deflecting means, image-forming the deflected laser beam as a light spot on the scanned face by means of an f-$\theta$ lens system; and scanning the scanned face with the light spot, the step of emitting the laser beam comprising the step of modulating the laser source such that one picture element can be recorded within a period of time of $\{L\cdot 2\ \psi(T)\}/(Nn l\omega)$ in a case where optical elements arranged on an optical path from the laser source to the scanned face include at least one plastic optical element and where each of the steps is performed at a surrounding temperature ranging from a lower limit Tmin to an upper limit Tmax, wherein L is an effective scan width set in design, N is a number of picture elements to be recorded within the effective scan width L, $\omega$ is an angular velocity of the deflection of deflected laser beam, $v(\theta)$ is the scan velocity of the light spot at a time when the deflected laser beam is deflected by a deflection angle $\theta$, $-\psi(T)$ and $+\psi(T)$ are respectively lower and upper limits of the integration $[\int v(d\theta]$ satisfying the relation $[L\cdot\omega = \int v(d\theta)]$ in a mean surrounding temperature defined by $T=(Tmax+Tmin)2$, and 1 is an arithmetical mean of $l$max and $l$min, wherein $l$max is the maximum value selected from the following four values: the maximum value $l$max (Tmax) and the minimum value 1 min (Tmax) of $l(\phi,n)$ at a maximum surrounding temperature Tmax, and the maximum value $l$max (Tmin) and the minimum value 1 min (Tmin) of $l(\phi,n)$ at a minimum surrounding temperature Tmin, wherein $l(\phi,n)$ is defined by the relations $$l(\theta,n)\cdot\omega = \int_{-\{(\psi(T)/n)+\phi\}}^{+\{(\psi(T)/n)+\phi\}} v(\theta)d\theta$$

$$2 \leq n \leq 12 \text{ and } -\psi + \frac{\psi}{n} \leq \phi \leq \psi - \frac{\psi}{n}.$$

According to the fourth feature of the invention, the laser source is modulated such that one picture element can be recorded within a period of time of $\{L\cdot 2\ \psi(T)\}/(Nn l\omega)$, and hence it becomes possible to effectively reduce the magnification error of the f-$\theta$ lens in the image-forming optical system even when the image-forming optical system includes one or more plastic optical elements which increase the magnification error with change in characteristics of the plastic optical elements caused by change in the surrounding temperature.

Further objects and advantages of the invention will be apparent from the following description of the preferred embodiments of the invention as illustrated in the accompanying drawings.

DESCRIPTION OF THE PREFERRED EMBODIMENTS

The inventions will be hereinafter described in detail by explaining principles and its embodiments.

Figure 1A:
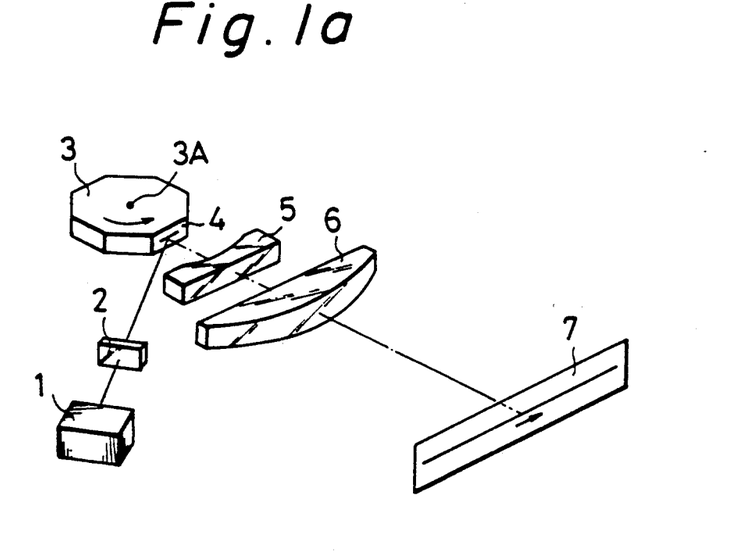
FIGS. 1a and 1b are diagrams for explaining a optical scanning apparatus to which the invention is applicable.
Figure 1B:
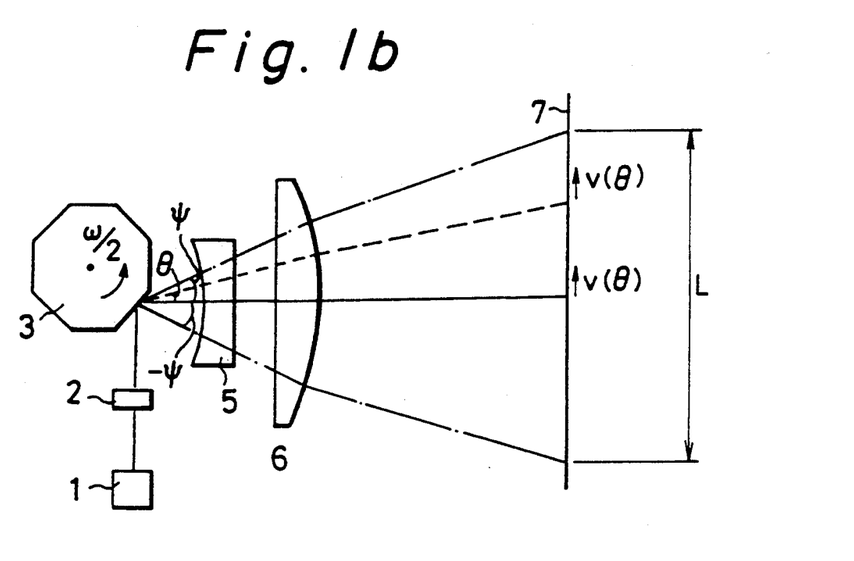

FIGS. 1a and 1b show an example of optical scanning apparatus to which the invention is applicable.

In FIG. 1a, there is provided a laser source unit 1 which is constructed by, for example, a semiconductor laser device and a collimator lens and emits a collimated laser beam modulated by a modulator (not shown). Thus emitted laser beam is condensed in a cross scan-corresponding direction by a cylindrical lens 2, and the condensed laser beam reaches a deflection reflecting facet 4 of a polygon mirror 3. The laser beam forms on the deflection reflecting facet 4 a linear image extending in a main scan-corresponding direction. Since the polygon mirror 3 rotates, about a rotating axis 3A at a uniform velocity, the incident laser beam is deflected at an equi-angular velocity to become a deflected laser beam. The deflected laser beam is shaped into a light spot through an image-forming optical system comprising lenses 5 and 6 so as to optically scan a scanned face 7.

The image-forming optical system of this example is anamorphic f-$\theta$ lenses consisting of two lenses 5 and 6.

FIG. 1b is a diagram showing the optical arrangement of the same optical scanning apparatus shown in FIG. 1a viewed from the cross scan-corresponding direction. In this figure, the main scanning direction is along the line indicating the scanned face 7, and the cross scanning direction is normal to the plane of the drawing. An optical path developed along the optical axis of the optical arrangement from the laser emitting source to the scanned face is called as developing optical path. At any point along the developing optical path, the direction parallel to the main scanning direction is defined as a main scan-corresponding direction, and the direction parallel to the cross scanning direction is referred to as a cross scan-corresponding direction.

An angle $\theta$ in FIG. 1b indicates a deflection angle of the deflected laser beam measured on the basis of the optical axis of the optical system. The velocity of the light spot moving on the scanned face 7 at a time when the deflected laser beam forms the deflection angle $\theta$ is indicated as $v(\theta)$ as shown in the figure. If the image-forming optical system has an ideal f-$\theta$ characteristic, $v(\theta)$ is to be constant, but generally it is a function of the deflection angle $\theta$, and is determined by the f-$\theta$ characteristic of each image-forming optical system. In FIG. 1b, L is an effective scan width set in design.

Assuming that the time required for the deflected laser beam to be deflected from the deflection angle $\theta$ by $d\theta$ is dt, the displacement dL of the light spot corresponding to a deflection of the differential angle $d\theta$ is represented by $v(\theta)$dt. On the other hand, $d\theta$/dt represents the angular velocity $\omega$ of the deflecting laser beam, is two times value of the angular velocity of the rotating polygon mirror 3 and is a constant value set in design.

Since $$d\theta/dt=\omega$$

may be written as:

$$dt=(1/\omega)d\theta,$$

then $$v(\theta)dt = v(\theta)d\theta/\omega$$

can be obtained.

Accordingly, when the region of deflection corresponding to the effective scan width L ranges from $-\psi$ to $+\psi$ as shown in FIG. 1b, an integral $$\int v(\theta)d\theta$$

calculated from $-\psi$ to $+\psi$ will be equal to $L \cdot \omega$. Describing this procedure from the designing view of the image-forming optical system, firstly, the effective scan width L in design is defined, and then $-\psi$ and $+\psi$ are determined in accordance with the f-$\theta$ characteristic of the image-forming optical system as an integration range satisfying the relation $$L \cdot \omega = \int v(\theta) d\theta.$$

As stated above, $v(\theta)$ generally varies in accordance with deflection angle $\theta$, so that $v(\theta)$ takes the maximum value Vmax and the minimum value Vmin in the range from $-\psi$ to $+\psi$. The arithmetic mean V can be given as $$V = (Vmax + Vmin)/2.$$

When the number of picture elements to be written in the range of the effective scan width is denoted by N, the width to be allotted for one picture element in the main scanning direction is to be L/N. Hence, at a time of performing the optical scanning according to the first feature of the invention, L/(NV) is adopted as one limitation of the time t required for one picture element to be recorded. This setting of the time t required for one picture element to be recorded corresponds to a case where the width for one picture element is scanned by the light spot at the mean velocity calculated above.

Scanning N picture elements in practice under this condition will not allow the scan width to be equal to L strictly. If the traveling velocity of the light spot is larger than V, the width of the picture element to be written in will be extended and if the velocity of the light spot is smaller than V, the width of the picture element to be written in will be reduced. In spite of the fact, since the velocity of the light spot is set as the average of the maximum value Vmax and the minimum value Vmin of the velocity of the light spot, the occurrence of extension in picture elements is almost as frequent as that of contraction in picture elements, so that the magnification error relating to a whole image recorded can be suppressed to a low level and the extensions and contractions of the recorded images situated in the vicinity of the places corresponding respectively to the aforementioned maximum velocity and the minimum velocity can be made unnoticeable.

On the other hand, $2\psi$ gives the deflection range of the deflecting laser beam required to scan the effective scan width L set in design, so that $2\psi/N$ corresponds to the deflecting angle corresponding to one ideal picture element. In the method of the first feature of the invention, $2\psi/(N\omega)$ is adopted as the other limitation of the aforementioned time t. In this case, the total width of the scanned face scanned actually in the optical scanning apparatus gives the effective width L set in design.

Consequently, setting the time t between the two limitations described above enables magnification error relating to the whole image recorded to be lessened.

Hereinafter, the embodiment of the first feature of the invention will be described with reference to the optical scanning apparatus shown in FIGS. 1a and 1b.

In the embodiment, none of optical elements is made of materials such as plastic and the likes.

Data on lenses 5 and 6 which constitute an image-forming optical system of anamorphic f-$\theta$ lenses are shown in Table 1.

In Table 1, Rmi denotes the radius of curvature of the i-th lens surface counted from the side of the deflection reflecting facet 4 of the polygon mirror with respect to the main scan-corresponding direction.

Rsi denotes the radius of curvature of the i-th lens surface counted from the side of the deflection reflecting facet 4 of the polygon mirror with respect to the cross scan-corresponding direction.

Here i is a suffix for lens surface. Di represents the distance on the optical axis between the ith lens surface and (i+1)th lens surface, and Nj denotes the refractive index of jth lens as adopting j as a suffix for lenses.

TABLE 1

| i | Rmi (mm) | Rsi (mm) | Di (mm) | j | Nj (mm) |
|---|---|---|---|---|---|
| 1 | −198.81 | −198.81 | 10.46 | 1 | 1.7122 |
| 2 | ∞ | 108.82 | 20.23 | | |
| 3 | ∞ | −108.82 | 12.56 | 2 | 1.6750 |
| 4 | −84.6 | −21.66 | | | |

The distance from the deflection reflecting facet 4 to the first lens surface on the optical axis is 14.85 mm. The distance from the fourth lens surface to the scanned face 7 on the optical axis is 206.82mm and the focal length f with respect to the main scan-corresponding direction is 184.43 mm.

At a time of using this lens system, the scanning velocity $v(\theta)$ of light spot on the scanned face 7 with respect to the deflection angle $\theta$ of the laser beam being deflected by the polygon mirror 3 can be expanded in a power series of $\theta$ as follows:

$$v(\theta) = (a_0 + a_1\theta + a_2\theta^2 + a_3\theta^3 + a_4\theta^4) \cdot \omega.$$

The factors of $a_0$ to $a_4$ are given as follows;

$$a_0 = 3.2189, \quad a_1 = 5.49116 \times 10^{-15}, \quad a_2 = 1.0729 \times 10^{-4},$$

$$a_3 = -1.0781 \times 10^{-17}, \text{ and } a_4 = -1.1616 \times 10^{-7}.$$

Assuming that L=210, $\omega$=72,000 (degrees/sec), image density is 400 dpi, N=3307 is obtained and $\pm\psi$ which are upper and lower limitations of the integration $[\int v(d\theta)]$ satisfying the relation $L \cdot \omega = \int v(d\theta)$ become $\pm 32.5$ (degrees).

The maximum value vmax and minimum value Vmin of $v(\theta)$ are respectively 233,546.4 mm/sec and 230,587.2mm/sec for the $\theta$ ranging:

$$-32.5° \leq \theta \leq +32.5°.$$

As a result of this, the arithmetical mean V of Vmax and Vmin is 23,2066.8 mm/sec.

With these conditions, L/(NV) and $2\psi/N\omega$ are calculated as:

$$L/(NV) = 2.7364 \times 10^{-7} \text{ (sec)}$$

$2\psi/N\omega = 2.7299 \times 10^{-7}$ (sec), so that by setting up the time t required to scan one picture element between these two values, it is possible to execute the method of the first feature of the invention. As a reference, if the time t is set up on the basis of the conventionally used relation:

$t = L/(f\omega N)$, the time t is calculated as $2.7400 \times 10^{-7}$.

Next explanation hereinafter will be made on the second feature of the invention.

At first the integral:

$\int v(\theta)d\theta$ is calculated from $-\{(\psi/n)+\phi\}$ to $\{(\psi/n)+\phi\}$. n is an arbitrary number in the range:

$2 \leq n \leq 12$, and $\psi$ has the same definition stated before. The above calculation is no more than performing an integration $[\int v(d\theta)]$ with respect to a range in which the deflection angle is increased by an angle of $\psi/n$ on the both sides of the region defined by the deflection angle $\theta$. Accordingly, the resultant integral is a function of the deflection angle $\theta$ and the number n. Hence this integral result is to be written as $l(\phi,n) \cdot \omega$.

In order to discuss the meaning of the integral $l(\phi,n)$, assuming that an image-forming optical system has an ideal f-$\theta$ characteristic and that the scanning velocity $v(\theta)$ of light spot on the scanned face 7 is to be constant without depending upon deflection angle $\theta$, the integral $l(\phi,n)$ does not become a function of $\phi$ but becomes a function of only n, and specifically the function is expressed as L/n.

Eventually, the length most sensible of the effect of the magnification error with respect to an image recorded actually by a optical scanning, falls generally between one half and one-twelfth of the image width, that is, the effective scan width. Hence, at first, the value of n corresponding to the scanning length selected to reduce the effect of the magnification error is specified. With respect to the specified value of n, the maximum value l max and the minimum value l min of $l(\phi,n)$ are determined. The arithmetical means of lmax and lmin represents an average tendency of the magnification error relative to the length of L/n which represents an ideal characteristic of the optical scanning.

According to the second feature of the invention, the time t required for one picture element to be recorded is set up as $t = (L \cdot 2\psi)/(Nnl\omega)$ to modulate the laser beam source.

This expression can be rewritten as $t = (2\psi/N\omega)(L/l\,n)$.

The term $(2\psi/N\omega)$ represents the time required for the deflected laser beam to be deflected by the deflection angle corresponding to one picture element. The term $(L/ln)$ is equal to 1 if the image-forming optical system has an ideal f-$\theta$ characteristic. When the average magnification error has a tendency to reduce, the value ln is smaller than L, thus (L/ln) becomes larger than 1. Consequently, in this case, the time t required for one picture element to be recorded is set up in such a manner as to have a longer period of time than the time required for one picture element to be recorded in the ideal optical scanning, whereby the magnification error having a tendency to reduce can be corrected.

On the other hand when the average magnification error has a tendency to increase, the time t required for one picture element to be recorded is set up in such manner as to have a shorter period of time than the time required for one picture element to be recorded in the ideal optical scanning, whereby the magnification error having a tendency to reduce can be corrected.

In an application of the method according to the second feature of the invention, taking 2 as a desired value of n, the value l is 104.94277 mm, and the corresponding t is equal to $2.7314 \times 10^{-7}$ sec.

Taking 12 as a desired value of n, l is 17.50218 mm and the corresponding t is equal to $2.7296 \times 10^{-7}$ sec.

The following explanation will be made on the method of the third feature of the invention.

In this case, an assumption is made that there is disposed on the optical path ranging from the laser source to the scanned face at least one optical element made of plastic.

Properties of the plastic optical element vary with monotonously with change in temperatures. Accordingly, in setting the time t required for one picture element to be recorded, the effect of a surrounding temperature is taken into consideration. Upper and lower limits of the surrounding temperature under which the optical scanning is to be performed are defined by Tmax and Tmin, respectively. Upper and lower limits of the integration $[\int v(d\theta)]$ satisfying the relation $[L \cdot \omega = \int v(d\theta)]$ in an average surrounding temperature $T(=(Tmax+Tmin)/2)$ are defined by $-\psi(T)$ and $+\psi(T)$, respectively. Maximum and minimum values of $v(\theta)$ at the maximum surrounding temperature Tmax in the range of $-\psi(T) \leq \theta \leq +\psi(T)$ are defined by Vmax (Tmax) and Vmin (Tmax), respectively. Maximum and minimum values of $v(\theta)$ at the minimum surrounding temperature Tmin in the range of $-\psi(T) \leq \theta \leq +\psi(T)$ are defined by Vmax (Tmin) and Vmin (Tmin). Maximum and minimum values among the four values of Vmax (Tmax), Vmin (Tmax), Vmax (Tmin) and Vmin (Tmin) are represented by Vmax and Vmin, respectively. An arithmetical mean of the maximum value Vmax and the minimum value Vmin is represented by $V(=(Vmax+Vmin)/2)$.

The time t required for one picture element to be recorded is set to one value within a range of L/(NV) and $2\psi(T)/(N\omega)$ while using the aforementioned arithmetical mean $V(=(Vmax+Vmin)/2)$ to modulate the laser source, whereby it becomes possible in the range of surrounding temperatures to effectively reduce the magnification error.

Next will be followed an explanation on the method according to the fourth feature of the invention.

This method is the same method as that of the second feature of the invention except the optical system includes the plastic optical elements as part thereof.

In this case, assuming that upon and lower limits of the integration $[\int v(d\theta)]$ satisfying the relation $[L \cdot \omega = \int v(d\theta)]$ at the mean surrounding temperature $T(=(Tmax+Tmin)/2)$ are represented by $-\psi(T)$ and $+\psi(T)$, respectively, that the maximum and minimum values of $l(\phi,n)$ at the maximum surrounding temperature Tmax defined by the relation [1 ($\phi$,n)·$\omega$=$\int v(d\theta)$] are represented by 1 max (Tmax) and 1 min (Tmax), respectively, that the maximum and minimum values of 1 ($\phi$,n) at the minimum surrounding temperature Tmin defined by the relation [1 ($\phi$,n) ·$\omega$=$\int v(d\theta)$] are represented by 1 max (Tmin) and1 min (Tmin), respectively, that the maximum and minimum values among the four values of 1 max (Tmax), 1 min (Tmax), 1 max (Tmin) and 1 min (Tmin) are represented by 1 max and 1 min, and that an arithmetical mean of 1 max and1 min is represented by 1 (=(1 max+1 min)/2), the time t required for one picture element to be recorded is set to the following value $$t=\{L\cdot 2\psi(T)\}/(Nnl\ \omega)$$

to modulate the laser source. Consequently, it becomes possible in the aforementioned range of the surrounding temperature to reduce the magnification error of the effective width of L/n.

Figure 2A:
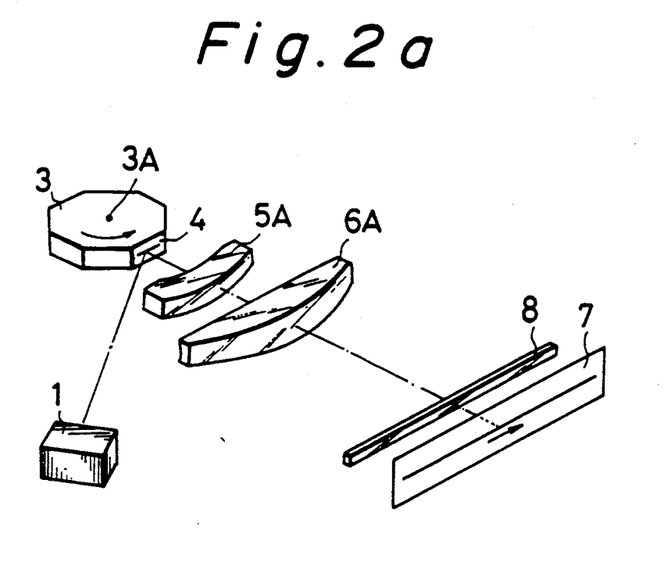
FIGS. 2a and 2b are diagrams showing another optical scanning apparatus to which the invention is applicable.
Figure 2B:
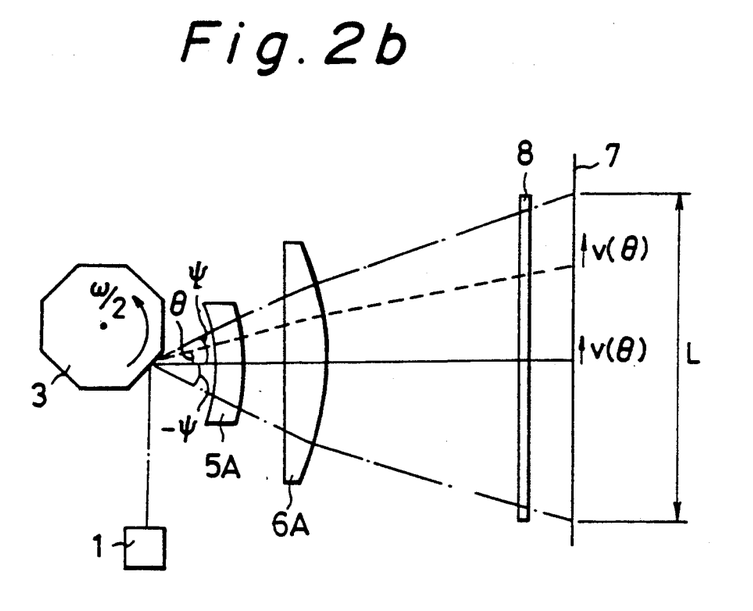
Figure 3A:
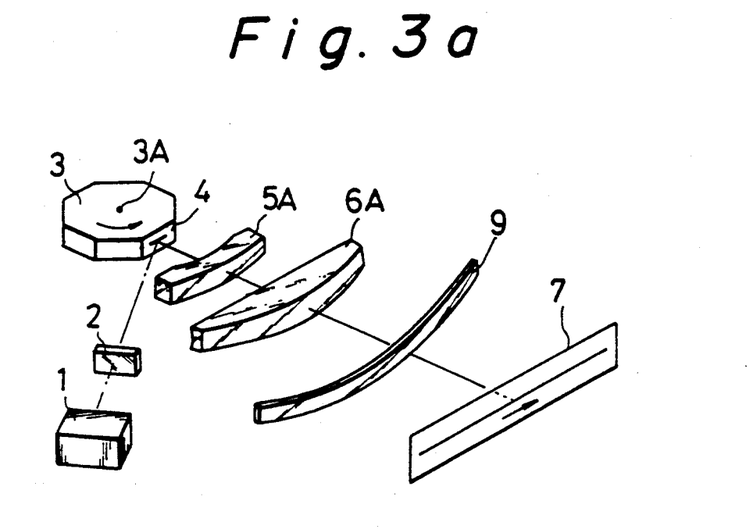
FIGS. 3a and 3b are diagrams showing still another optical scanning apparatus to which the invention is applicable.
Figure 3B:
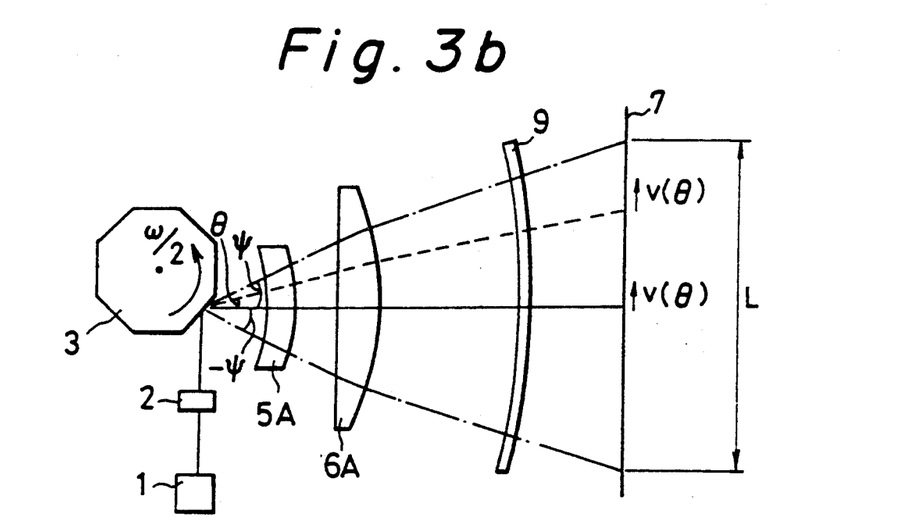

FIGS. 2 and 3 show other examples of the optical scanning apparatus to which the invention can be applied. To avoid complexity, the same numerals as shown in FIG. 1 are used as far as there occurs no confusion. In FIG. 2b and FIG. 3b, $\theta$ indicates a deflection angle and $\pm\psi$ are the upper and lower limits of the integration [$\int v(d\theta)$] satisfying the relation [$L\cdot\omega=\int v(d\theta)$].

In FIG. 2, the f-$\theta$ lenses of the image-forming optical system comprise a lenses 5A and 6A, and a long size cylindrical lens 8.

In FIG. 3, the f-$\theta$ lenses of the image-forming optical system comprise a lenses 5A and 6A, and a long size toroidal lens 9.

When image density can be selected among plural types such as 400 dpi and 200 dpi, the time t may be set up for each image density according to the method of the invention.

Many widely different embodiments of the invention may be constructed without departing from the spirit and scope of the invention. It should be understood that the invention is not limited to the specific embodiments described in the specification, except as defined in the appended claims.

What is claimed is:

1. A method for optically scanning a scanned face, comprising the steps of:
   emitting a laser beam from a laser source;
   converging the emitted laser beam with respect to a cross scan-corresponding direction;
   deflecting the converged laser beam at an equi-angular velocity toward said scanned face;
   image-forming the deflected laser beam as a light spot on said scanned face by means of an f-$\theta$ lens system; and
   scanning said scanned face with said light spot,
   the step of emitting said laser beam comprising the step of modulating said laser source such that one picture element can be recorded within a period of time t defined between L/(NV) and 2$\psi$/(N$\omega$), where L is an effective scan width set in design, N is a number of picture elements to be recorded within the effective scan width L, $\omega$ is an angular velocity of the deflection of said deflected laser beam, v($\theta$) is a scan velocity of the light spot on said scanned face at a time when a deflected laser beam is deflected by a deflection angle $\theta$, $-\psi$ and $+\psi$ are respectively lower and upper limits of the integration [$\int v(d\theta)$] satisfying the relation [$L\cdot\omega=\int v(d\theta)$], and V is an arithmetical mean ((Vmax+Vmin)/2) of a maximum value Vmax and a minimum value Vmin of v($\theta$) in a range of $$-\psi \leq \theta \leq +\psi.$$

2. A method for optically scanning a scanned face, comprising the steps of:
   emitting a laser beam from a laser source;
   converging said emitted laser beam with respect to a cross scan-corresponding direction;
   deflecting said converged laser beam at an equiangular velocity by means of a deflecting means;
   image-forming said deflected laser beam as a light spot on said scanned face by means of an f-$\theta$ lens system; and
   scanning the scanned face with said light spot,
   the step of emitting said laser beam comprising the step of modulating said laser source such that one picture element can be recorded within a period of time of (L·2$\psi$)/(Nnl $\omega$), where L is an effective scan width set in design, N is a number of picture elements within the effective scan width L, $\omega$ is an angular velocity of the deflection of said deflected laser beam, v($\theta$) is a scan velocity of the light spot on said scanned face at a time when the deflected laser beam is deflected by a deflection angle $\theta$, $-\psi$ and $+\psi$ are respectively lower and upper limits of the integration [$\int v(d\theta)$] satisfying the relation [$L\cdot\omega=\int v(d\theta)$], and l is an arithmetical average of a maximum value of l ($\phi$,n) and a minimum value of l ($\phi$,n), in which the function l ($\phi$,n) is defined by the following formula, $$\int_{-\{(\psi/n)+\phi\}}^{\{(\psi/n)+\phi\}} v(\theta)d\theta = l(\phi,n),$$

wherein $2 \leq n \leq 12$ and $-\psi + \frac{\psi}{n} \leq \phi \leq \psi - \frac{\psi}{n}$.

3. A method for optically scanning a scanned face, comprising the steps of:
   emitting a laser beam from a laser source;
   converging said emitted laser beam with respect to a cross scan-corresponding direction;
   deflecting said converged laser beam at an equiangular velocity by means of a deflecting means;
   image-forming said deflected laser beam as a light spot on said scanned face by means of an f-$\theta$ lens system; and
   scanning said scanned face with said light spot, the step of emitting said laser beam comprising the step of modulating said laser source such that one picture element can be recorded within a period of time within a range of L/(NV) to 2$\psi$(T)/(N$\omega$) in a case where optical elements arranged on an optical path from said laser source to said scanned face include at least one plastic optical element and where each of said steps is performed at a surrounding temperature ranging from a lower limit Tmin to an upper limit Tmax,
   wherein L is an effective scan width set in design, N is a number of picture elements to be recorded within the effective scan width L, $\omega$ is an angular velocity of the deflection of said deflected laser beam, v($\theta$) is a scan velocity of the light spot at a time when said deflected laser beam is deflected by a deflection angle $\theta$, $-\psi(T)$ and $+\psi(T)$ are respectively lower and upper limits of the integration $[\int v(d\theta]$ satisfying the relation $[L\cdot\omega=\int v(d\theta)]$ at a mean surrounding temperature defined by $T(=(Tmax+Tmin)/2)$, and V is an arithmetical mean of Vmax and Vmin, wherein Vmax is a maximum value selected from the following four values: a maximum value Vmax (Tmax) and a minimum value Vmin (Tmax) of $v(\theta)$ at a maximum surrounding temperature Tmax in a range of $-\psi(T) \leq \theta \leq +\psi(T)$ and a maximum value Vmax (Tmin) and a minimum value Vmin (Tmin) of $v(\theta)$ at a minimum surrounding temperature Tmin in a range of $-\psi(T) \leq \theta \leq +\psi(T)$, and Vmin is a minimum value selected from four values of Vmax (Tmax), Vmin (Tmax), Vmax (Tmin) and Vmin (Tmin).

4. A method for optically scanning a scanned face, comprising the steps of:

emitting a laser beam from a laser source;

converging said emitted laser beam with respect to a cross scan-corresponding direction;

deflecting said converged laser beam at an equiangular velocity by means of a deflecting means;

image-forming said deflected laser beam as a light spot on said scanned face by means of an f-$\theta$ lens system; and scanning said scanned face with said light spot, the step of emitting said laser beam comprising the step of modulating said laser source such that one picture element can be recorded within a period of time of $\{L\cdot 2\psi(T)\}/(Nnl\,\omega)$ in a case where optical elements arranged on an optical path from said laser source to said scanned face include at least one plastic optical element and where each of said steps is performed at a surrounding temperature ranging from a lower limit Tmin to an upper limit Tmax, wherein L is an effective scan width set in design, N is a number of picture elements to be recorded within said effective scan width L, $\omega$ is an angular velocity of the deflection of said deflected laser beam, $v(\theta)$ is a scan velocity of said light spot at a time when said deflected laser beam is deflected by a deflection angle $\theta$, $-\psi(T)$ and $+\psi(T)$ are respectively lower and upper limits of the integration $[\int v(d\theta)]$ satisfying the relation $[L\cdot\omega=\int v(d\theta)]$ in a mean surrounding temperature defined by $T(=(Tmax+Tmin)/2)$, and l is an arithmetical mean of l max and l min, wherein l max is a maximum value selected from the following four values: a maximum value l max (Tmax) and a minimum value l min (Tmax) of l $(\phi,n)$ at a maximum surrounding temperature Tmax, and a maximum value l max (Tmin) and a minimum value l min (Tmin) of l $(\phi,n)$ at a minimum surrounding temperature Tmin, wherein l $(\phi,n)$ is defined by the following formulas $$l(\theta,n)\cdot\omega = \int_{-\{(\psi(T)/n)+\phi\}}^{+\{(\psi(T)/n)+\phi\}} v(\theta)d\theta$$

$$2 \leq n \leq 12 \text{ and } -\psi + \frac{\psi}{n} \leq \phi \leq \psi - \frac{\psi}{n}.$$

* * * * *